(12) United States Patent
Kobayashi et al.

(10) Patent No.: US 10,775,164 B2
(45) Date of Patent: Sep. 15, 2020

(54) MEASUREMENT SYSTEM, MACHINING SYSTEM, MEASUREMENT METHOD, AND COMPUTER-READABLE RECORDING MEDIUM

(71) Applicant: MITSUBISHI HEAVY INDUSTRIES, LTD., Tokyo (JP)

(72) Inventors: Tetsuhei Kobayashi, Tokyo (JP); Sho Onodera, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 141 days.

(21) Appl. No.: 16/202,709

(22) Filed: Nov. 28, 2018

(65) Prior Publication Data

US 2019/0162531 A1 May 30, 2019

(30) Foreign Application Priority Data

Nov. 29, 2017 (JP) ................. 2017-229611

(51) Int. Cl.
*G01B 17/00* (2006.01)
*B23H 3/02* (2006.01)
(Continued)

(52) U.S. Cl.
CPC ............ *G01B 17/00* (2013.01); *B23H 3/02* (2013.01); *F01D 21/003* (2013.01); *B23H 9/10* (2013.01);
(Continued)

(58) Field of Classification Search
CPC ........... G01B 17/00; G01B 17/06; B01H 9/14
See application file for complete search history.

(56) References Cited

U.S. PATENT DOCUMENTS 5,286,947 A * 2/1994 Clyde .................. B23K 31/006
219/121.68
5,294,308 A * 3/1994 Asaoka .................... B23H 3/02
204/DIG. 9
(Continued)

FOREIGN PATENT DOCUMENTS

JP 5595171 9/2014
JP 5955207 7/2016

*Primary Examiner* — Paul M. West
*Assistant Examiner* — Mark A Shabman
(74) *Attorney, Agent, or Firm* — Wenderoth, Lind & Ponack, L.L.P.

(57) ABSTRACT

A measurement system is for measuring positions of a plurality of subjects by using an ultrasonic testing sensor. The measurement system includes an ideal arcuate waveform creation unit configured to create, for each of the subjects, an ideal arcuate waveform of a measurement result of the ultrasonic testing sensor based on machining position information on the subject; a measurement arcuate waveform creation unit configured to create a measurement arcuate waveform based on the measurement result; a position estimation unit configured to collate the ideal arcuate waveform and the measurement arcuate waveform with each other to estimate a position of the subject from the measurement arcuate waveform determined to correspond to any ideal arcuate waveform; and an antiphase waveform addition unit configured to add, to the measurement arcuate waveform, a waveform in antiphase to the measurement arcuate waveform with which the position of the subject has been estimated.

7 Claims, 11 Drawing Sheets

(51) Int. Cl.
*F01D 21/00* (2006.01)
*B23H 9/10* (2006.01)
*B23H 9/14* (2006.01)
*B23H 11/00* (2006.01)

(52) U.S. Cl.
CPC ............... *B23H 9/14* (2013.01); *B23H 11/00* (2013.01); *F05D 2270/80* (2013.01)

(56) References Cited

U.S. PATENT DOCUMENTS

| | | | | |
|---|---|---|---|---|
| 5,831,407 | A * | 11/1998 | Ouchi | G05B 19/4068 318/567 |
| 6,850,874 | B1 * | 2/2005 | Higuerey | B23H 7/20 703/4 |
| 9,336,628 | B2 * | 5/2016 | Chuang | G06T 17/30 |
| 2008/0260537 | A1 * | 10/2008 | Lang | F01D 5/189 416/96 R |
| 2009/0134136 | A1 * | 5/2009 | Graichen | B23H 9/00 219/121.71 |
| 2012/0138586 | A1 * | 6/2012 | Webster | C21D 10/00 219/121.64 |
| 2015/0273602 | A1 * | 10/2015 | Mukai | B23H 9/16 204/224 M |
| 2017/0120337 | A1 * | 5/2017 | Kanko | B29C 64/386 |

* cited by examiner

MEASUREMENT SYSTEM, MACHINING SYSTEM, MEASUREMENT METHOD, AND COMPUTER-READABLE RECORDING MEDIUM

CROSS-REFERENCE TO RELATED APPLICATIONS

The present application claims priority to and incorporates by reference the entire contents of Japanese Patent Application No. 2017-229611 filed in Japan on Nov. 29, 2017.

FIELD

The present invention relates to a measurement system, a machining system, a measurement method, and a computer-readable recording medium.

BACKGROUND

Increased combustion temperatures in a gas turbine have promoted development of long and large turbine blades. Such a long and large turbine blade has a cooling hole for efficiently cooling the turbine blade.

Technologies of boring by electrochemical machining to form the cooling hole in the turbine blade have been known (see, for example, Patent Literature 1 and Patent Literature 2).

CITATION LIST

Patent Literature

Patent Literature 1: Japanese Patent No. 5595171
Patent Literature 2: Japanese Patent No. 5955207

SUMMARY

Technical Problem

A cooling hole is formed into a shape having a high aspect ratio. A plurality of cooling holes are formed in one turbine blade. The cooling holes are arranged such that the interval between adjacent cooling holes increases in a trapezoidal pattern from a blade tip to a blade root of the turbine blade. Thus, the interval between cooling holes in the vicinity of the blade tip is narrow. The position of the thus formed cooling hole is measured by using an ultrasonic testing sensor, which is one of non-destructive inspection sensors. In the measurement using the ultrasonic testing sensor, however, when waves reflected from contiguous cooling holes interfere with each other, the positions of the cooling holes are not accurately measured in some cases.

The present invention has been made in view of such circumstances, and it is an object thereof to provide a measurement system, a machining system, a measurement method, and a computer program capable of measuring a position with high accuracy.

Solution to Problem

According to an aspect of the present invention, a measurement system for measuring positions of a plurality of subjects by using an ultrasonic testing sensor includes an ideal arcuate waveform creation unit configured to create, for each of the subjects, an ideal arcuate waveform of a measurement result of the ultrasonic testing sensor based on machining position information on the subject; a measurement arcuate waveform creation unit configured to create a measurement arcuate waveform based on the measurement result; a position estimation unit configured to collate the ideal arcuate waveform and the measurement arcuate waveform with each other to estimate a position of the subject from the measurement arcuate waveform determined to correspond to any ideal arcuate waveform; and an antiphase waveform addition unit configured to add, to the measurement arcuate waveform, a waveform in antiphase to the measurement arcuate waveform with which the position of the subject has been estimated.

This configuration enables the position to be measured with high accuracy.

The subject may be a cooling hole produced in a turbine blade of a gas turbine. This configuration enables the position of a cooling hole formed in a turbine blade of a gas turbine to be measured with high accuracy.

The measurement system may further include the ultrasonic testing sensor configured to measure the positions of the plurality of subjects and output the measurement results to the measurement system. This configuration enables the position to be measured with high accuracy.

According to another aspect of the present invention, a measurement method for measuring positions of a plurality of subjects by using an ultrasonic testing sensor includes creating, for each of the subjects, an ideal arcuate waveform as a measurement result of the ultrasonic testing sensor based on machining position information on the subject; creating a measurement arcuate waveform based on the measurement result; collating the ideal arcuate waveform and the measurement arcuate waveform with each other to estimate the position of the subject from the measurement arcuate waveform determined to correspond to any ideal arcuate waveform; and adding, to the measurement arcuate waveform, a waveform in antiphase to the measurement arcuate waveform with which the position of the subject has been estimated.

This method enables the position to be measured with high accuracy.

According to still another aspect of the present invention, a non-transitory computer-readable recording medium stores an executable program for measuring positions of a plurality of subjects by using an ultrasonic testing sensor. The computer program causes a computer to execute: creating, for each of the subjects, an ideal arcuate waveform as a measurement result of the ultrasonic testing sensor based on machining position information on the subject; creating a measurement arcuate waveform based on the measurement result; collating the ideal arcuate waveform and the measurement arcuate waveform with each other to estimate the position of the subject from the measurement arcuate waveform determined to correspond to any ideal arcuate waveform; and adding, to the measurement arcuate waveform, a waveform in antiphase to the measurement arcuate waveform with which the position of the subject has been estimated.

This program enables the position to be measured with high accuracy.

Advantageous Effects of Invention

According to the present invention, a measurement system, a machining system, a measurement method, and a computer program capable of measuring a position with high accuracy can be implemented.

DESCRIPTION OF EMBODIMENTS

Embodiments of the present invention are described in detail below with reference to the accompanying drawings. The present invention is not limited to each of the following embodiments, and can be carried out with appropriate changes.

Figure 1:
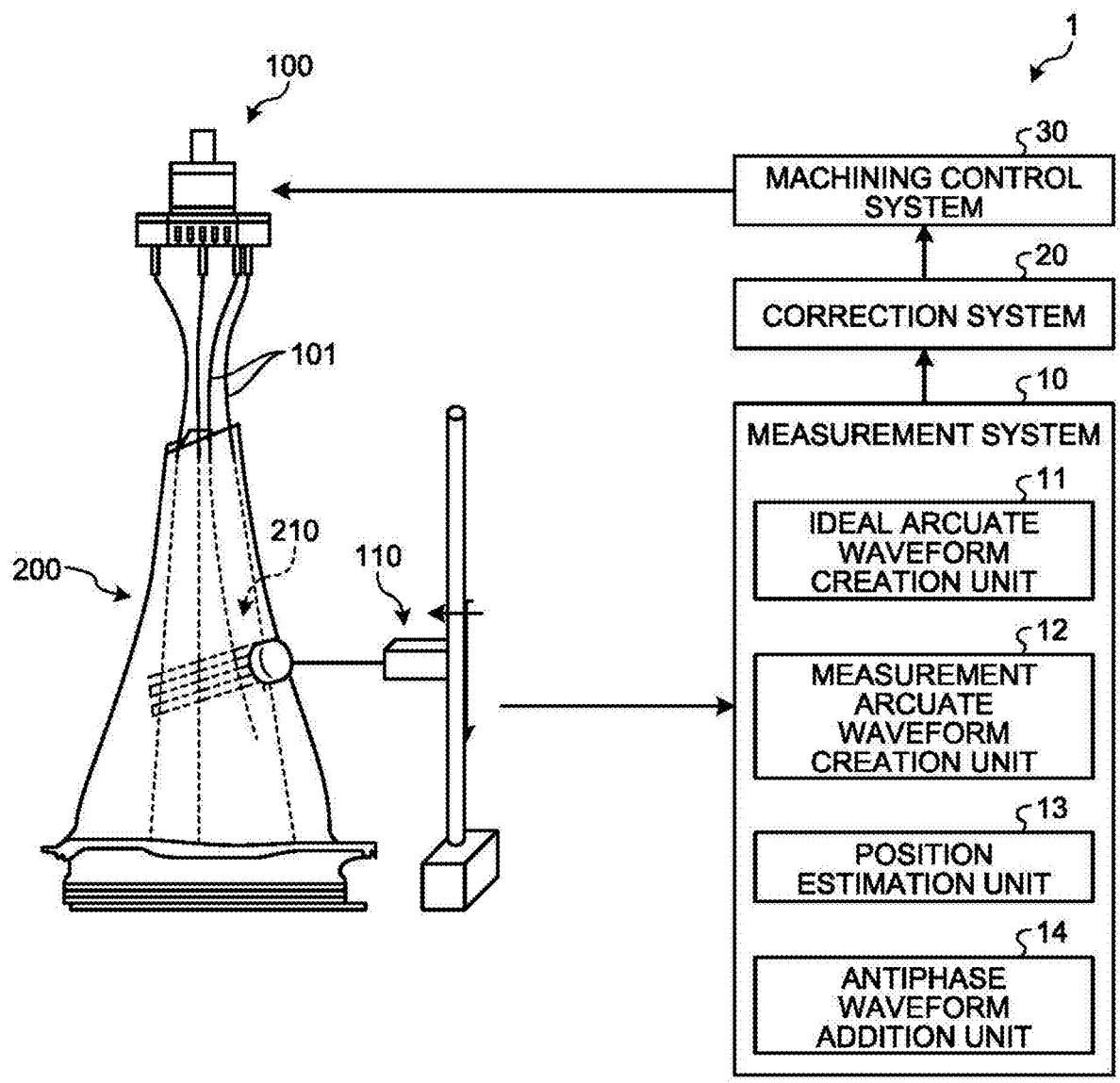
FIG. 1 is a block diagram illustrating a schematic configuration of a machining system including a measurement system according to an embodiment of the present invention.

FIG. 1 is a block diagram illustrating a schematic configuration of a machining system including a measurement system according to an embodiment of the present invention. A machining system 1 includes a machining device 100, an ultrasonic testing sensor 110, a measurement system 10, a correction system 20, and a machining control system 30. In the machining system 1, the machining device 100 produces a subject by machining. In the machining system 1, the measurement system 10 uses the ultrasonic testing sensor 110 to measure the position of the produced subject. In the machining system 1, the correction system 20 changes a machining condition based on the position of the subject. In the machining system 1, the machining control system 30 controls the machining device 100 based on the machining condition. In the present embodiment, the subject is a cooling hole 210 that is to be formed in a turbine blade 200 of a gas turbine by machining.

The turbine blade 200 is formed by casting. In the turbine blade 200, a plurality of cooling holes 210 are arranged so as to spread in a trapezoidal pattern from the blade tip to the blade root in order to cool the turbine blade 200.

The cooling hole 210 is formed in the turbine blade 200 by the machining device 100. The cooling hole 210 has a circular sectional shape in sectional view including the leading edge and the trailing edge. The cooling hole 210 extends in a direction connecting the blade tip and the blade root. The cooling hole 210 has a shape having a high aspect ratio. In other words, the cooling hole 210 has a depth longer than the diameter of the cooling hole 210. The cooling holes 210 are arranged side by side in sectional view including the leading edge and the trailing edge. In other words, the cooling holes 210 are arranged side by side in a direction connecting the leading edge and the trailing edge of the turbine blade 200. The cooling holes 210 are arranged such that the interval between adjacent cooling holes 210 becomes wider from the blade tip toward the blade root. In other words, the intervals between cooling holes 210 are narrow on the blade tip side, and the intervals between cooling holes 210 are wide on the blade root side.

The machining device 100 produces a plurality of subjects by machining. In the present embodiment, the machining device 100 is an electrochemical machining device configured to bore the turbine blade 200 (i.e., workpiece) by electrochemical machining to produce the cooling hole 210. The machining device 100 is controlled by the machining system 1 so as to operate based on the machining condition. The machining device 100 has a plurality of electrode rods 101. In this manner, the machining device 100 produces the cooling holes 210 simultaneously from the blade tip toward the blade root. For example, the machining condition includes at least one of the liquid flow rate of electrolyte solution, applied current, feed speed, and the angle of oscillation.

Figure 2:
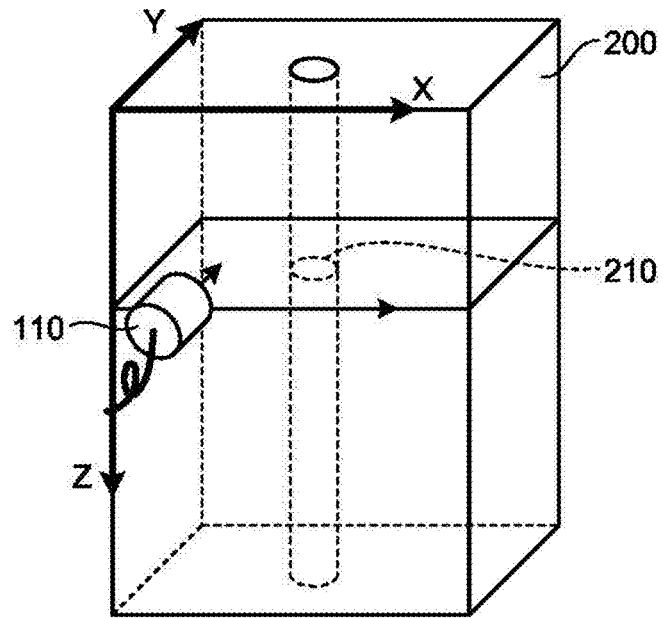
FIG. 2 is a schematic diagram illustrating a cooling hole formed in a turbine blade measured by the measurement system according to the embodiment of the present invention.
Figure 3:
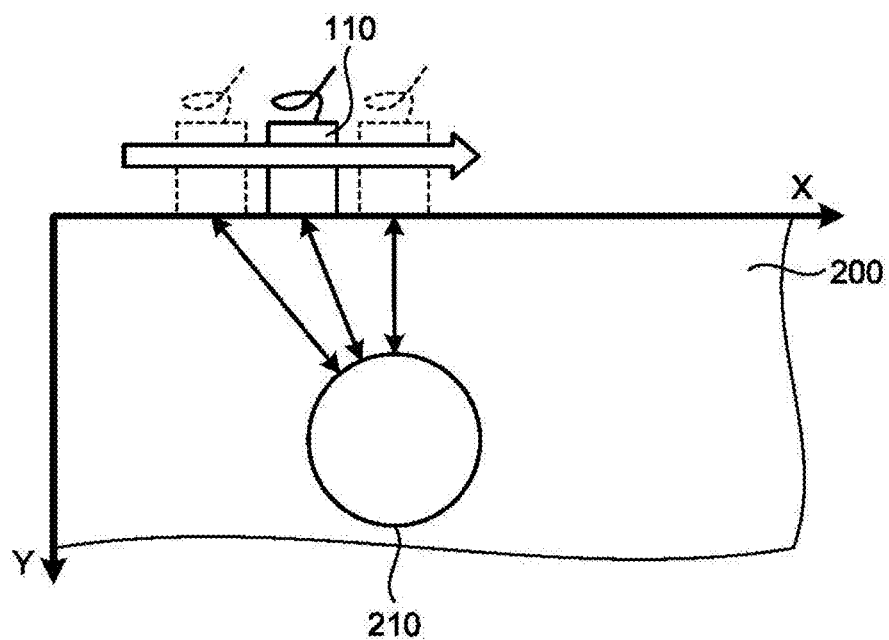
FIG. 3 is a schematic diagram illustrating the cooling hole formed in the turbine blade measured by the measurement system according to the embodiment of the present invention.

Referring to FIG. 2 and FIG. 3, the ultrasonic testing sensor 110 is described. FIG. 2 is a schematic diagram illustrating a cooling hole produced in the turbine blade measured by the measurement system according to the embodiment of the present invention. FIG. 3 is a schematic diagram illustrating the cooling hole produced in the turbine blade measured by the measurement system according to the embodiment of the present invention. The X direction is a scanning direction of the ultrasonic testing sensor 110. The Y direction represents a thickness direction of the turbine blade 200. The Z direction is a direction connecting the blade tip and the blade root.

The ultrasonic testing sensor 110 is one of non-destructive inspection sensors. The ultrasonic testing sensor 110 measures the position of a subject produced by the machining device 100. In the present embodiment, at the time of machining by the machining device 100, the ultrasonic testing sensor 110 measures the position of the cooling hole 210 produced by boring the turbine blade 200 by the machining device 100. In particular, the ultrasonic testing sensor 110 can measure the position of the bottom of the cooling hole 210 or a position near the bottom of the cooling hole 210. In other words, the measured position may indicate the position of the bottom of the cooling hole 210. The ultrasonic testing sensor 110 causes ultrasonic waves to enter the turbine blade 200 from the outer peripheral surface thereof toward the inside, and acquires waves reflected by the cooling hole 210. The ultrasonic testing sensor 110 outputs measurement signals as measurement results to the measurement system 10.

The ultrasonic testing sensor 110 scans the outer peripheral surface of the turbine blade 200 along the scanning direction. The scanning direction is a direction in which cooling holes 210 are arranged side by side, in other words, a direction connecting the leading edge and the trailing edge of the turbine blade 200. After the scanning in the scanning direction is finished, the ultrasonic testing sensor 110 shifts its position in a direction (depth direction) in which the cooling hole 210 is to be produced to extend, in other words, the direction connecting the blade tip and the blade root, and scans the outer peripheral surface of the turbine blade 200 again in the scanning direction. By repeating such scanning, the ultrasonic testing sensor 110 measures the position (of the bottom) of the cooling hole 210 while the cooling hole 210 is produced in the turbine blade 200.

Referring back to FIG. 1, the measurement system 10 is described. The measurement system 10 measures the positions of subjects by using the ultrasonic testing sensor 110. In the present embodiment, the measurement system 10 measures the positions of cooling holes 210 by using the ultrasonic testing sensor 110. The measurement system 10 includes a memory and a CPU. The measurement system 10 may be implemented by dedicated hardware, or the functions of the measurement system 10 may be implemented by loading a computer program for implementing its functions onto a memory and executing the computer program. The measurement system 10 includes an ideal arcuate waveform creation unit 11, a measurement arcuate waveform creation unit 12, a position estimation unit 13, and an antiphase waveform addition unit 14. The computer program can be provided as a computer-readable recording medium on which the program is stored, such as a CD, a DVD, or a semiconductor memory.

The ideal arcuate waveform creation unit 11 creates, for each subject, an ideal arcuate waveform 300 (see FIG. 5) of a measurement result of the ultrasonic testing sensor 110 based on machining position information on the subject. In the present embodiment, the ideal arcuate waveform creation unit 11 creates, for each cooling hole 210, an ideal arcuate waveform 300 obtained from a measurement result of the ultrasonic testing sensor 110 based on machining position information on the cooling hole 210. The machining position information includes information on the hole center position and the hole diameter of the cooling hole 210 that are set when designing the cooling hole 210.

When a cooling hole 210 is produced with no error from machining position information set in advance, the ideal arcuate waveform 300 is a waveform having a strained arc shape (hereinafter referred to as "arcuate waveform") calculated based on a signal measured by the ultrasonic testing sensor 110. The arcuate waveform is a waveform having a boomerang shape formed by a curve that is curved to be convex.

Figure 4:
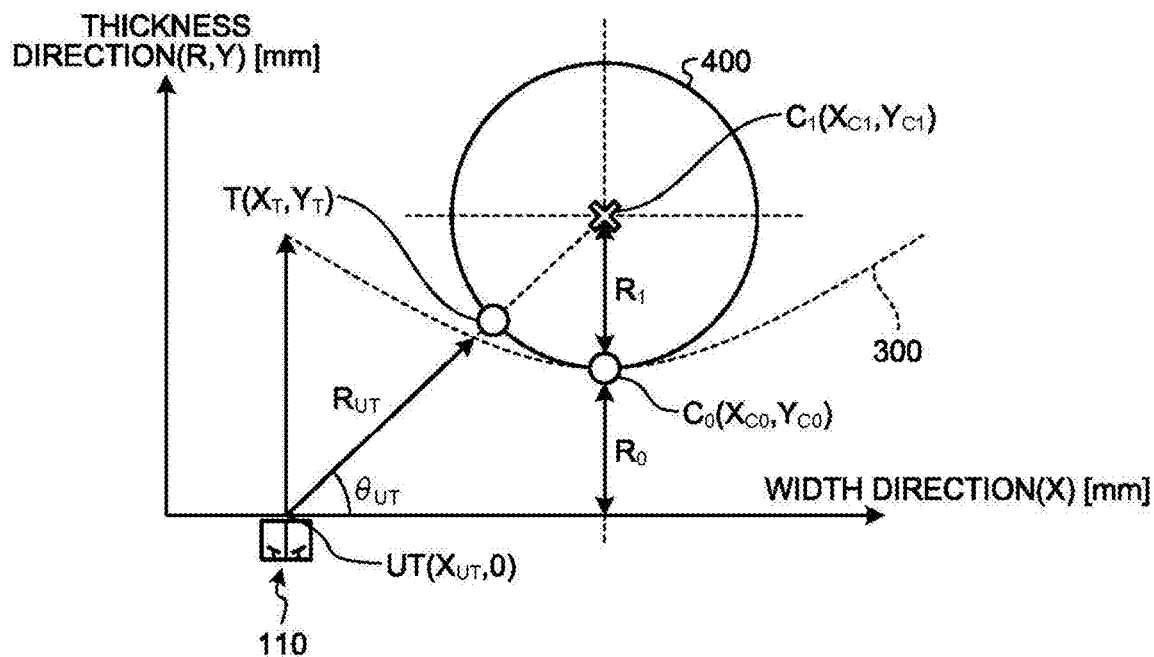
FIG. 4 is a diagram for describing the creation of an ideal arcuate waveform by the measurement system according to the embodiment of the present invention.
Figure 5:
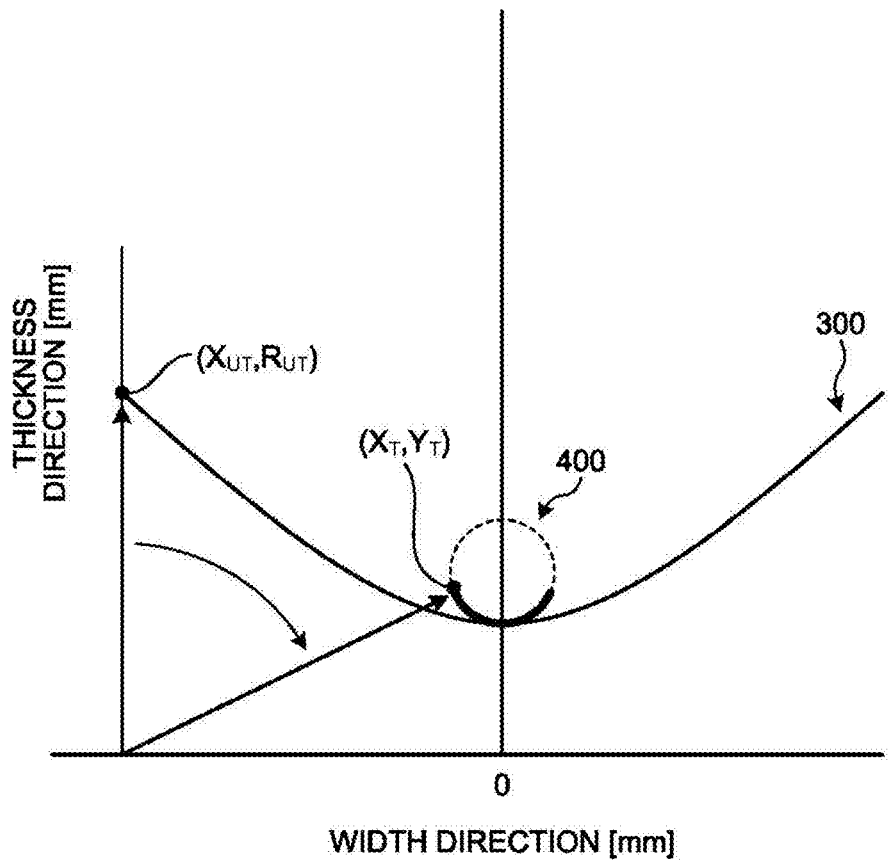
FIG. 5 is a diagram for describing an example of the ideal arcuate waveform created by the measurement system according to the embodiment of the present invention.

Referring to FIG. 4 and FIG. 5, the creation of the ideal arcuate waveform 300 by the ideal arcuate waveform creation unit 11 is described. FIG. 4 is a diagram for describing the creation of the ideal arcuate waveform in the measurement system according to the embodiment of the present invention. FIG. 5 is a diagram for describing an example of the ideal arcuate waveform created by the measurement system according to the embodiment of the present invention. FIG. 4 illustrates the positional relation between the cooling hole 210 and the ultrasonic testing sensor 110 in the case where the cooling hole 210 is produced with no error from machining position information set in advance. The cooling hole 210 has a circular shape with a radius $R_1$, which has a hole center position $C_1$ ($X_{c1}$, $Y_{c1}$) at the position of a depth $R_0+R_1$ from the surface of the turbine blade 200. The shape of the cooling hole 210 is illustrated by a hole surface shape 400. The shallowest position of the cooling hole 210 with respect to the surface of the turbine blade 200 is represented by $C_0$ ($X_{C0}$, $Y_{C0}$). The depth from the surface of the turbine blade 200 at the shallowest position $C_0$ of the cooling hole 210 is $R_0$. A sensor position of the ultrasonic testing sensor 110 is represented by $UT(X_{ut}, 0)$.

First, an arcuate waveform scope ($X_{ut}$, $R_{ut}$), which is a graph whose horizontal axis is the width direction position X and vertical axis is the distance R, is calculated. When there is no measurement error in the positional relation illustrated in FIG. 4, a distance $R_{ut}$ to the cooling hole 210 is calculated by Equation (1), with each sensor position $X_{ut}$ as an input condition.

$$R_{UT}+R_1=\sqrt{(X_{UT}-X_{C1})^2+Y_{C1}^2} \rightarrow R_{UT}= \sqrt{(X_{UT}-X_{C1})^2+Y_{C1}^2}-R_1, \text{ where } X_{C1}=X_{C0}, Y_{C1}=R_0+R_1 \quad (1)$$

Next, a hole surface position $T(X_T, Y_T)$ is calculated from the arcuate waveform scope ($X_{ut}$, $R_{ut}$). The hole surface position $T(X_T, Y_T)$ is calculated by Equation (2) from the shallowest position $C_0(X_{C0}, Y_{C0})$ and the arcuate waveform scope ($X_{ut}$, $R_{ut}$).

$$\theta_{UT} = \cos^{-1}\left(\frac{X_{C1}-X_{UT}}{R_{UT}+R_1}\right) \quad (2)$$

$$X_T = (X_{C1}-X_{UT}) + R_{UT}*\cos\theta_{UT}$$

$$Y_T = R_{UT}*\sin\theta_{UT}$$

In this manner, the ideal arcuate waveform 300 and the circular hole surface shape 400 are calculated as illustrated in FIG. 5, with the shallowest position $C_0(X_{c0}, Y_{C0})$ or the hole center position $C_1(X_{c1}, Y_{c1})$ and the radius $R_1$ as input conditions. The ideal arcuate waveform 300 is represented by not two-dimensional orthogonal coordinates (X, Y) but a coordinate system of (X, R), and hence has a strained arc shape, in other words, an arcuate shape.

The measurement arcuate waveform creation unit 12 creates a measurement arcuate waveform 310 (see FIG. 8) based on measurement results of the ultrasonic testing sensor 110.

The measurement arcuate waveform 310 matches the ideal arcuate waveform 300 when the cooling hole 210 is produced with no error from machining position information set in advance. The measurement arcuate waveform 310 is displaced from the ideal arcuate waveform 300 when the produced cooling hole 210 has an error from machining position information set in advance.

Figure 6:
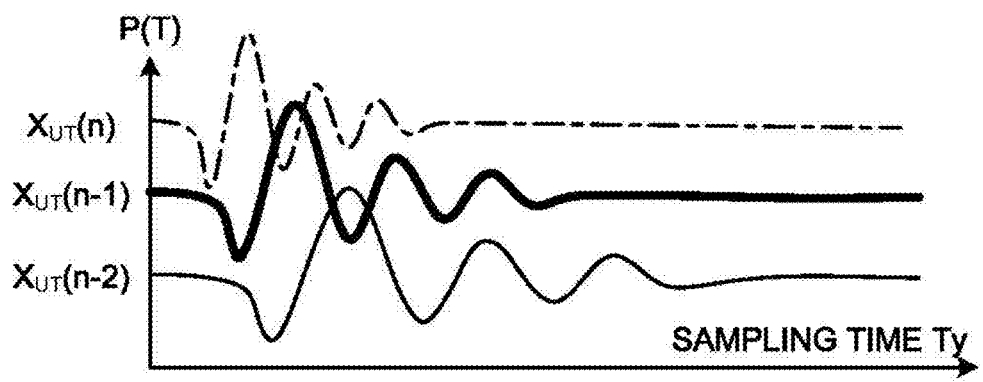
FIG. 6 is a diagram for describing an example of signals of measurement results acquired by the measurement system according to the embodiment of the present invention.
Figure 7:
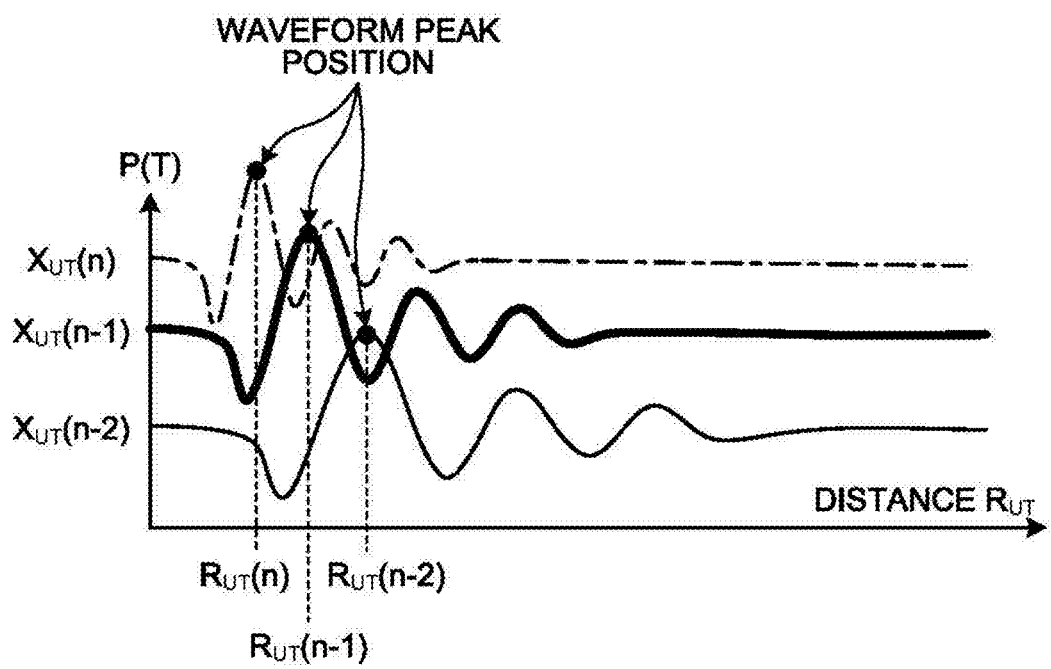
FIG. 7 is a diagram for describing an example in which signals of the measurement results acquired by the measurement system are converted in terms of sound speed according to the embodiment of the present invention.
Figure 8:
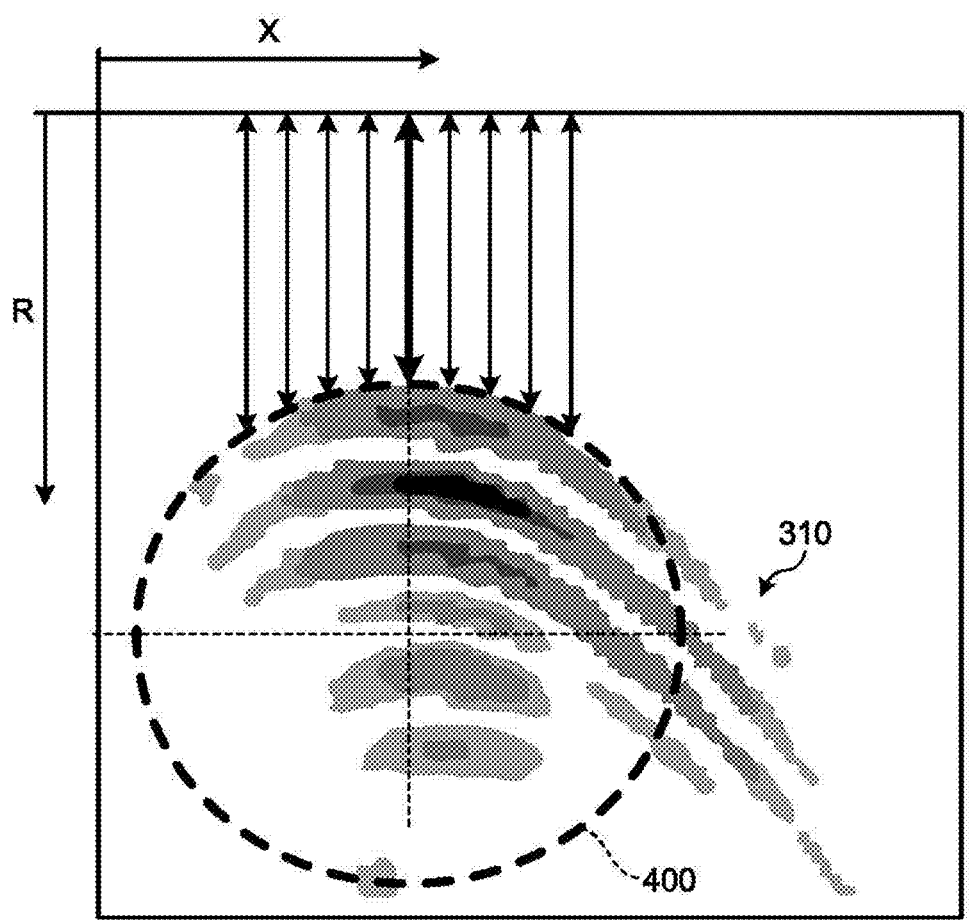
FIG. 8 is a diagram illustrating an example of measurement arcuate waveforms created by the measurement system according to the embodiment of the present invention.

Referring to FIG. 6 to FIG. 8, the creation of the measurement arcuate waveform 310 by the measurement arcuate waveform creation unit 12 is described. For the sake of description, the case where the number of cooling holes 210 is one is described. FIG. 6 is a diagram for describing an example of signals of measurement results acquired by the measurement system according to the embodiment of the present invention. FIG. 7 is a diagram for describing an example in which the signals of the measurement results acquired by the measurement system are converted in terms of sound speed according to the embodiment of the present invention. FIG. 8 is a diagram for describing an example of the measurement arcuate waveform created by the measurement system according to the embodiment of the present invention.

The measurement arcuate waveform creation unit 12 acquires signals of measurement results of the ultrasonic testing sensor 110. As illustrated in FIG. 6, the measurement result of the ultrasonic testing sensor 110 is acquired for each sensor position Xs of the ultrasonic testing sensor 110, and is expressed in a graph whose horizontal axis is sampling time Ty and vertical axis is power P(T) of reflected sound.

Based on the signals of the measurement results of the ultrasonic testing sensor 110, sound speed a in the mold forming the turbine blade 200 and a transfer offset Q between the ultrasonic testing sensor 110 and the surface of the turbine blade 200 are used to convert the sampling time Ty into the distance $R_{ut}$ by Equation (3) in terms of sound speed.

$$\text{DISTANCE } R = \alpha \times Ty + \beta \quad (3)$$

FIG. 7 illustrates results of converting the signals illustrated in FIG. 6 in terms of sound speed. In FIG. 7, the horizontal axis represents the distance $R_{ut}$, and the vertical axis represents the power P(T) of reflected sound.

In FIG. 7, for example, peak points or inflection points by binarization of the signals in the width direction positions are extracted to create an arcuate waveform scope whose horizontal axis is the width direction position X and vertical axis is the distance R. When there are cooling holes 210, all peak points or all inflection points by binarization of the signals only need to be extracted to create arcuate waveform scopes of the cooling holes 210.

FIG. 8 illustrates an example of the created arcuate waveform scope. In the arcuate waveform scope illustrated in FIG. 8, the measurement arcuate waveform 310 is illustrated in a darker color as the signal intensity becomes higher and in a lighter color as the signal intensity becomes lower. The shape of the cooling hole 210 is illustrated as a hole surface shape 400.

In the present embodiment, the measurement arcuate waveform creation unit 12 creates arcuate waveform scopes corresponding to cooling holes 210 based on measurement results of the ultrasonic testing sensor 110. In the present embodiment, the measurement arcuate waveform 310 illustrated in the arcuate waveform scope includes measurement signal components of cooling holes 210.

The position estimation unit 13 collates the ideal arcuate waveform 300 and the measurement arcuate waveform 310 with each other, and estimates the position of the subject from the measurement arcuate waveform 310 determined to correspond to any ideal arcuate waveform 300. In the present embodiment, the position estimation unit 13 collates the ideal arcuate waveform 300 created by the ideal arcuate waveform creation unit 11 and the measurement arcuate waveform 310 created by the measurement arcuate waveform creation unit 12 with each other, and estimates the position of the cooling hole 210 from the measurement arcuate waveform 310 determined to correspond to any ideal arcuate waveform 300. More specifically, the position estimation unit 13 collates an image of the ideal arcuate waveform 300 and an image of the measurement arcuate waveform 310 with each other by image pattern matching, and identifies a measurement arcuate waveform 310 that is present near the ideal arcuate waveform 300 and similar to the ideal arcuate waveform 300. For example, the position estimation unit 13 identifies a measurement arcuate waveform 310 that has a convex portion near a convex portion of the ideal arcuate waveform 300 and has a similar convex shape. When there are cooling holes 210, a measurement signal component of one cooling hole 210 among the measurement arcuate waveforms 310 is similar to one ideal arcuate waveform 300.

The position of the cooling hole 210 is estimated based on the identified measurement arcuate waveform 310. In the present embodiment, the hole center position $C_1$ ($X_{c1}, Y_{c1}$) of the cooling hole 210 is estimated by Equation (4) and Equation (5) described below as the position of the cooling hole 210.

The following description assumes that the arcuate waveform scope illustrated in FIG. 8 represents the identified measurement arcuate waveform 310. In other words, the following description assumes that the arcuate waveform scope illustrated in FIG. 8 represents the measurement arcuate waveform 310 that is a measurement signal component of one cooling hole 210, which is similar to one ideal arcuate waveform 300. A part of the measurement arcuate waveform 310 illustrated in FIG. 8 with the smallest distance R, which is indicated by the thick arrows, is calculated by Equation (4) in which the minimum value of the distance between the ultrasonic testing sensor 110 and the cooling hole 210, that is, the shallowest position $C_0$ is represented by a position $Y_{C0}$ of the distance R in the thickness direction, and a corresponding sensor position Xs is represented by $X_{C0}$.

$$(X_{C0}, Y_{C0}) = (X_{OT}(\text{SENSOR POSITION WHEN } R \text{ IS SMALLEST}), R_{UT}(\text{MINIMUM VALUE})) \quad (4)$$

Next, the hole center position $C_1(X_{c1}, Y_{c1})$ is estimated. When a produced cooling hole 210 is a true circle, the hole center position $C_1(X_{c1}, Y_{c1})$ is present on a straight line passing through the ultrasonic testing sensor 110 and the shallowest position $C_0(X_{c0}, Y_{c0})$ at a position obtained by adding the shallowest position $C_0(X_{c0}, Y_{c0})$ to the radius $R_1$ of the cooling hole 210. The radius $R_1$ of the cooling hole 210 can be calculated from the arcuate shape. However, casting easily causes measurement errors. Thus, the hole center position $C_1(X_{c1}, Y_{c1})$ is calculated by Equation (5) in which the radius $R_1$ of the cooling hole 210 is an estimated value obtained by inputting an assumed value with errors ignored.

$$(X_{c1}, Y_{c1}) = (X_{c0}, Y_{c1} + R) \quad (5)$$

Figure 9:
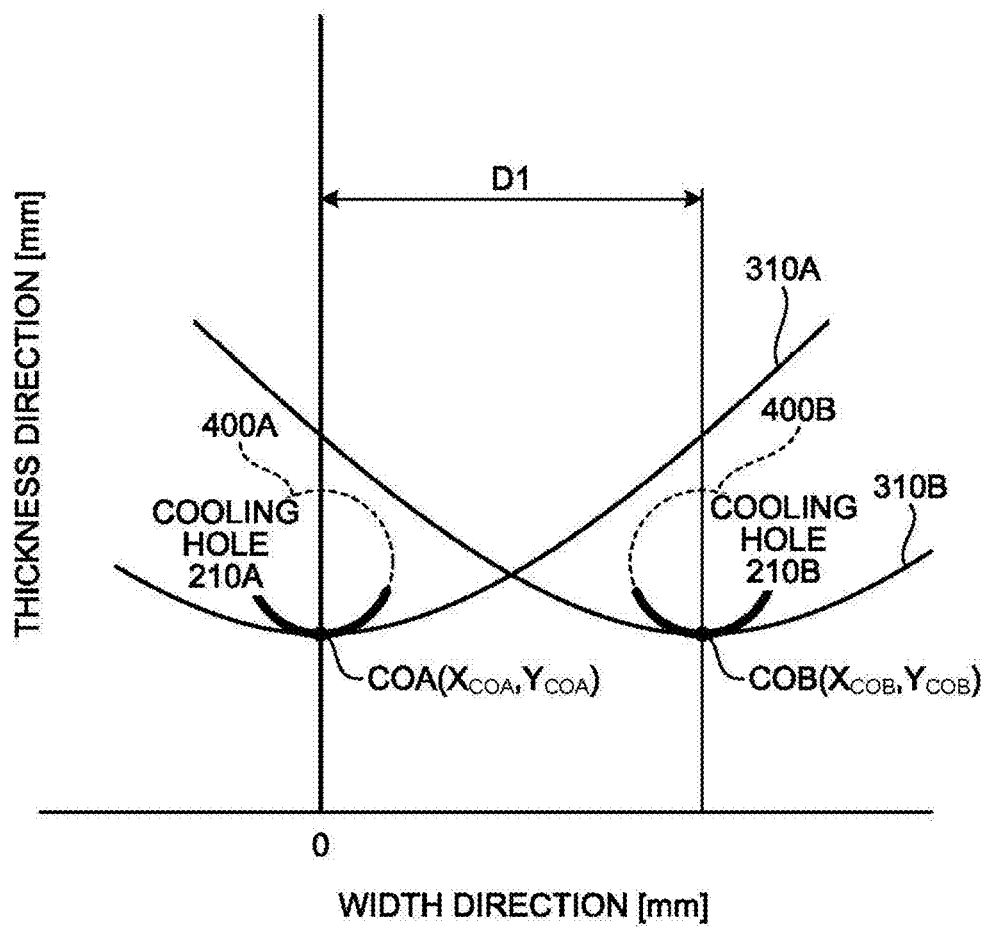
FIG. 9 is a diagram for describing measurement arcuate waveforms created by the measurement system according to the embodiment of the present invention, illustrating an example of the case where there are two contiguous cooling holes.
Figure 10:
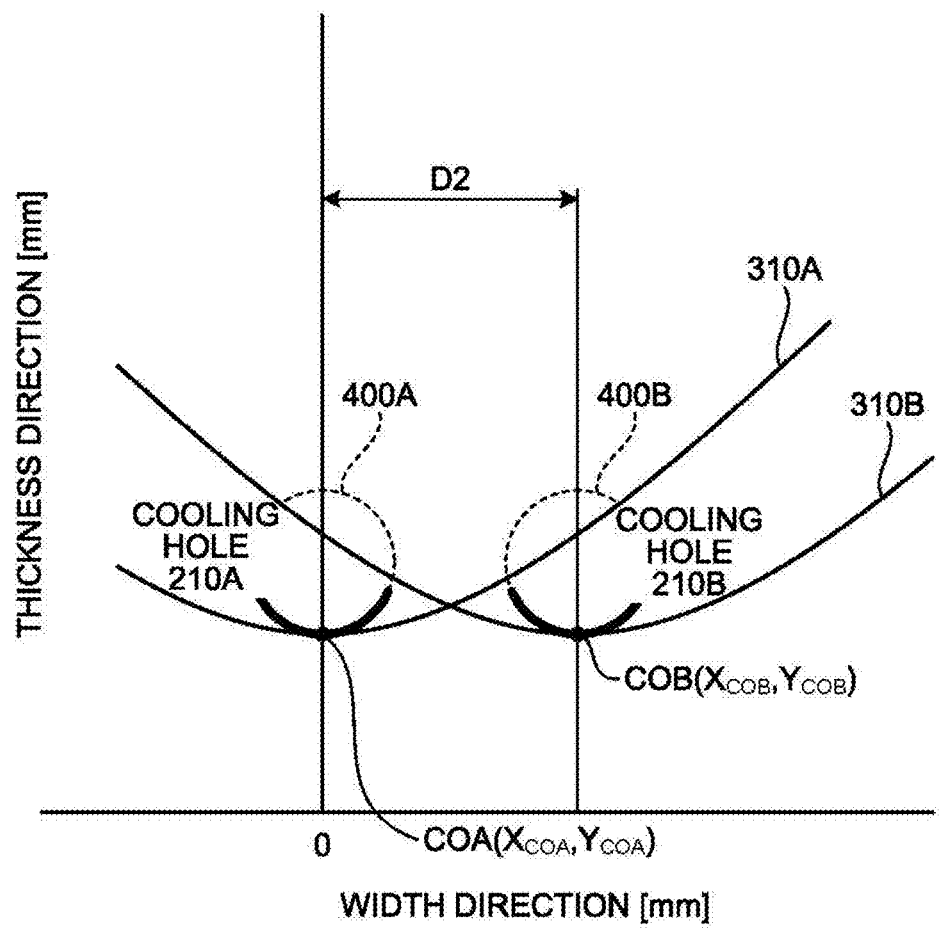
FIG. 10 is a diagram for describing measurement arcuate waveforms created by the measurement system according to the embodiment of the present invention, illustrating another example of the case where there are two contiguous cooling holes.
Figure 11:
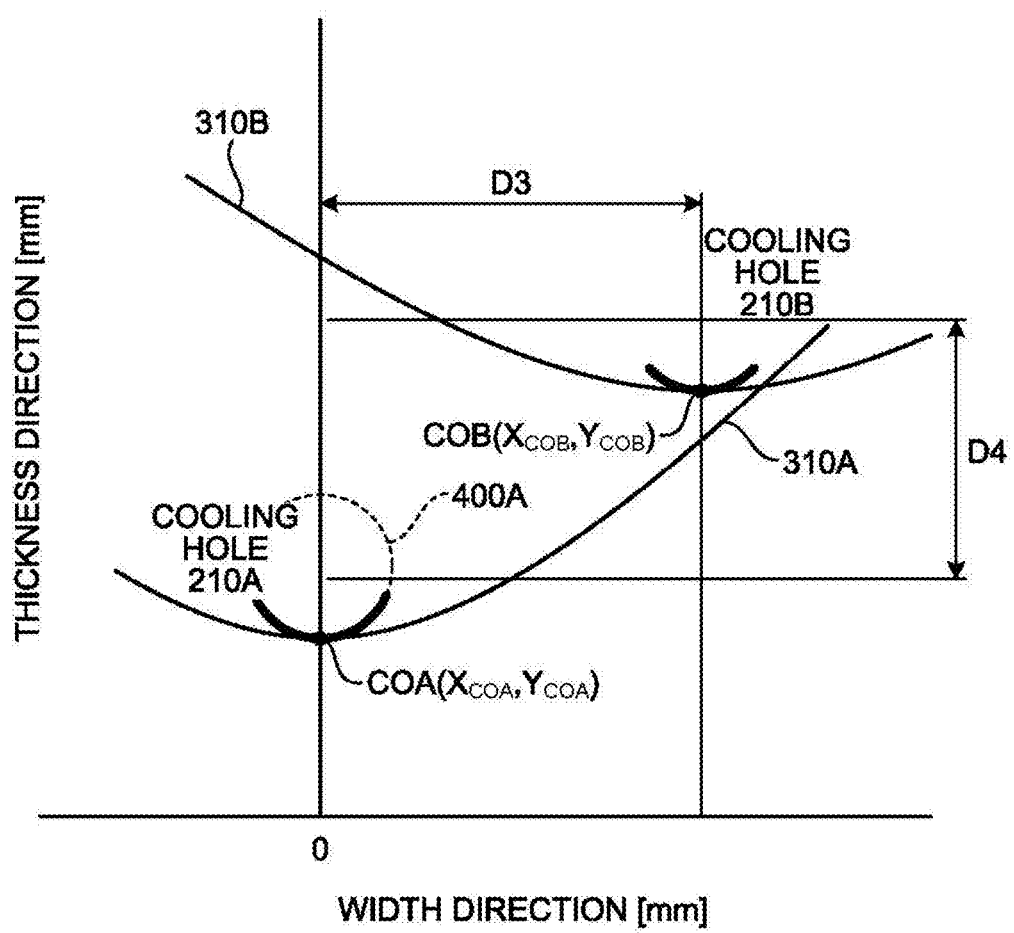
FIG. 11 is a diagram for describing measurement arcuate waveforms created by the measurement system according to the embodiment of the present invention, illustrating another example of the case where there are two contiguous cooling holes.

Referring to FIG. 9 to FIG. 11, a measurement arcuate waveform 310A and a measurement arcuate waveform 310B in a case where the turbine blade 200 has two cooling holes 210A and 210B are described. FIG. 9 is a diagram for describing measurement arcuate waveforms created by the measurement system according to the embodiment of the present invention, illustrating an example of the case where there are two contiguous cooling holes. FIG. 10 is a diagram for describing measurement arcuate waveforms created by the measurement system according to the embodiment of the present invention, illustrating another example of the case where there are two contiguous cooling holes. FIG. 11 is a diagram for describing measurement arcuate waveforms created by the measurement system according to the embodiment of the present invention, illustrating another example of the case where there are two contiguous cooling holes. FIG. 9 illustrates the measurement arcuate waveform 310A and the measurement arcuate waveform 310B when the distance between the two adjacent cooling holes 210A and 210B in the width direction is D1. FIG. 10 illustrates the measurement arcuate waveform 310A and the measurement arcuate waveform 310B when the distance between the two adjacent cooling holes 210A and 210B in the width direction is D2 (<D1). FIG. 11 illustrates the measurement arcuate waveform 310A and the measurement arcuate waveform 310B when the distance between the two adjacent cooling holes 210A and 210B in the width direction is D3, and the distance therebetween in the thickness direction is D4. From the above, the measurement arcuate waveform 310A and the measurement arcuate waveform 310B more overlap with each other as the distance between the two adjacent cooling holes 210A and 210B in the width direction becomes smaller.

As illustrated in FIG. 9 and FIG. 10, when the two adjacent cooling holes 210A and 210B are arranged apart from each other by an appropriate distance, the measurement arcuate waveform 310A and the measurement arcuate waveform 310B can be identified as corresponding ideal arcuate waveforms 300. A shallowest position $C_{OA}(X_{COA}, Y_{COA})$ of the cooling hole 210A and a shallowest position $C_{OB}(X_{COB}, Y_{COB})$ of the cooling hole 210B can be estimated. In other words, a hole surface shape 400A of the cooling hole 210A and a hole surface shape 400B of the cooling hole 210B can be calculated.

As illustrated in FIG. 11, when the two adjacent cooling holes 210A and 210B are not apart from each other by an appropriate distance, it is difficult to identify the measurement arcuate waveform 310A or the measurement arcuate waveform 310B as a corresponding ideal arcuate waveform 300. The two measurement arcuate waveforms 310A and 310B interfere with each other to make it difficult to estimate the shallowest position $C_{OA}(X_{COA}, Y_{COA})$ of the cooling hole 210A or the shallowest position $C_{OB}(X_{COB}, Y_{CO3})$ of the cooling hole 210B. In the example illustrated in FIG. 11, the shallowest position $C_{OA}(X_{COA}, Y_{COA})$ of the cooling hole 210A can be estimated, but the shallowest position $C_{OB}(X_{COB}, Y_{COB})$ of the cooling hole 210B cannot be estimated. In other words, in this state, the hole surface shape 400A of the cooling hole 210A can be calculated, but the hole surface shape 400B of the cooling hole 210B cannot be calculated.

The antiphase waveform addition unit 14 adds, to the measurement arcuate waveform 310, a waveform in antiphase to the measurement arcuate waveform 310 with which the position of the subject has been estimated. In the present embodiment, the antiphase waveform addition unit 14 adds, to the measurement arcuate waveform 310, a waveform in antiphase to the measurement arcuate waveform 310 with which the position of the cooling hole 210 has been estimated by the position estimation unit 13. The antiphase waveform addition unit 14 removes, from the measurement arcuate waveform 310, a measurement signal component of a cooling hole 210 whose position has been estimated, and only measurement signal components of cooling holes 210 whose positions have not been estimated are left. In other words, the antiphase waveform addition unit 14 obtains a measurement arcuate waveform 310 from which the measurement arcuate waveform 310 used to estimate the position of the cooling hole 210 has been subtracted.

Based on the measurement result of the measurement system 10, the correction system 20 changes machining conditions of the subject and corrects the position of the subject. In the present embodiment, at the time of machining by the machining device 100, the correction system 20 changes the machining condition of the cooling hole 210 and corrects the position of the cooling hole 210 based on the measurement result of the measurement system 10. More specifically, when a produced cooling hole 210 has an error from machining position information set in advance, based on the measurement result of the measurement system 10, the correction system 20 changes the machining condition so as to eliminate the error and corrects the machining position of the cooling hole 210 to be continuously produced. In this manner, at the time of machining of the cooling hole 210 by the machining device 100, the correction system 20 changes the machining condition of the cooling hole 210 in accordance with the measurement result of the measurement system 10, thereby correcting the position (machining position) of the cooling hole 210 as needed.

The machining control system 30 controls the machining device 100 based on the machining condition changed by the correction system 20 at the time of machining by the machining device 100. More specifically, when a produced cooling hole 210 has an error from machining position information set in advance, the machining control system 30 controls the machining device 100 such that the position of the cooling hole 210 is corrected based on the machining condition changed by the correction system 20. In this manner, at the time of machining of the cooling hole 210 by the machining device 100, the machining control system 30 controls the machining device 100 as needed such that the position of the cooling hole 210 is corrected depending on the machining condition changed in accordance with the measurement result of the measurement system 10. In other words, the machining control system 30 controls the machining device 100 to continuously produce the hole 210 according to the changed machining condition.

Figure 12:
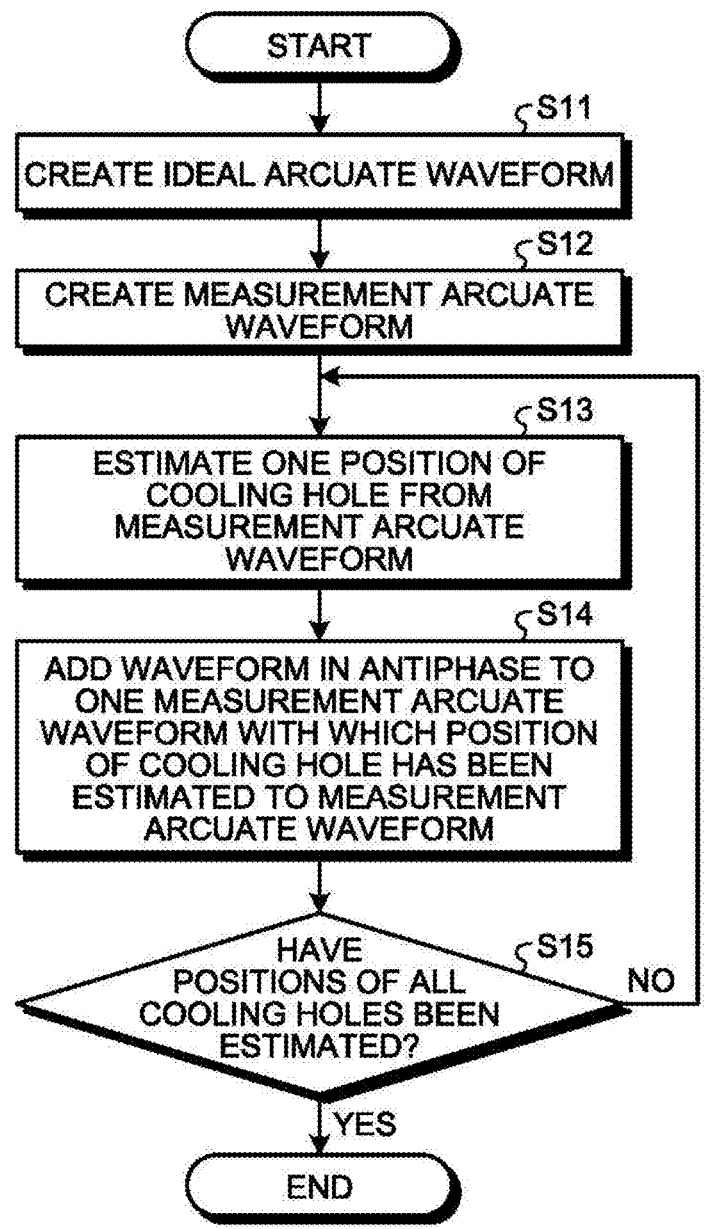
FIG. 12 is a flowchart illustrating an example of a measurement method for the measurement system according to the embodiment of the present invention.

Next, referring to FIG. 12, a measurement method using the measurement system 10 is described. FIG. 12 is a flowchart illustrating an example of the measurement method for the measurement system according to the embodiment of the present invention. The measurement system 10 constantly runs while the machining system 1 is running. While the measurement system 10 is running, the position of a cooling hole 210 bored by the machining device 100 is measured by the ultrasonic testing sensor 110. The measurement system 10 constantly acquires measurement results from the ultrasonic testing sensor 110. The measurement system 10 repeatedly executes the machining of Step S11 to Step S15 based on the acquired measurement result.

The measurement system 10 creates an ideal arcuate waveform 300 (Step S11). More specifically, the measurement system 10 uses the ideal arcuate waveform creation unit 11 to create, for each cooling hole 210, an ideal arcuate waveform 300 of a measurement result of the ultrasonic testing sensor 110 based on machining position information on the cooling hole 210. Step S11 is an ideal arcuate waveform creation step. The measurement system 10 proceeds to Step S12.

The measurement system 10 creates a measurement arcuate waveform 310 (Step S12). More specifically, the measurement system 10 uses the measurement arcuate waveform creation unit 12 to create a measurement arcuate waveform 310 based on a measurement result of the ultrasonic testing sensor 110. Step S12 is a measurement arcuate waveform creation step. The measurement system 10 proceeds to Step S13.

The measurement system 10 estimates one position of the cooling hole 210 from the measurement arcuate waveform 310 (Step S13). More specifically, the measurement system 10 uses the position estimation unit 13 to collate the ideal arcuate waveform 300 and the measurement arcuate waveform 310 with each other, and estimate one position of the cooling hole 210 from the measurement arcuate waveform 310 determined to correspond to any ideal arcuate waveform 300. Step S13 is a position estimation step. The measurement system 10 proceeds to Step S14.

The measurement system 10 adds, to the measurement arcuate waveform 310, a waveform in antiphase to the measurement arcuate waveform 310 with which the position of the cooling hole 210 has been estimated (Step S14). More specifically, the measurement system 10 uses the antiphase waveform addition unit 14 to add, to the measurement arcuate waveform 310, a waveform in antiphase to the measurement arcuate waveform 310 with which the position of the cooling hole 210 has been estimated by the position estimation unit 13. Step S14 is an antiphase waveform addition step. The measurement system 10 proceeds to Step S15.

The measurement system 10 determines whether the positions of all cooling holes 210 have been estimated (Step S15). When the measurement system 10 determines that the positions of all cooling hole 210 have not been estimated (No at Step S15), the measurement system 10 repeats the processing of Step S13. When the measurement system 10 determines that the positions of all cooling holes 210 have been estimated (Yes at Step S15), the measurement system 10 finishes the processing of this flowchart.

Figure 13:
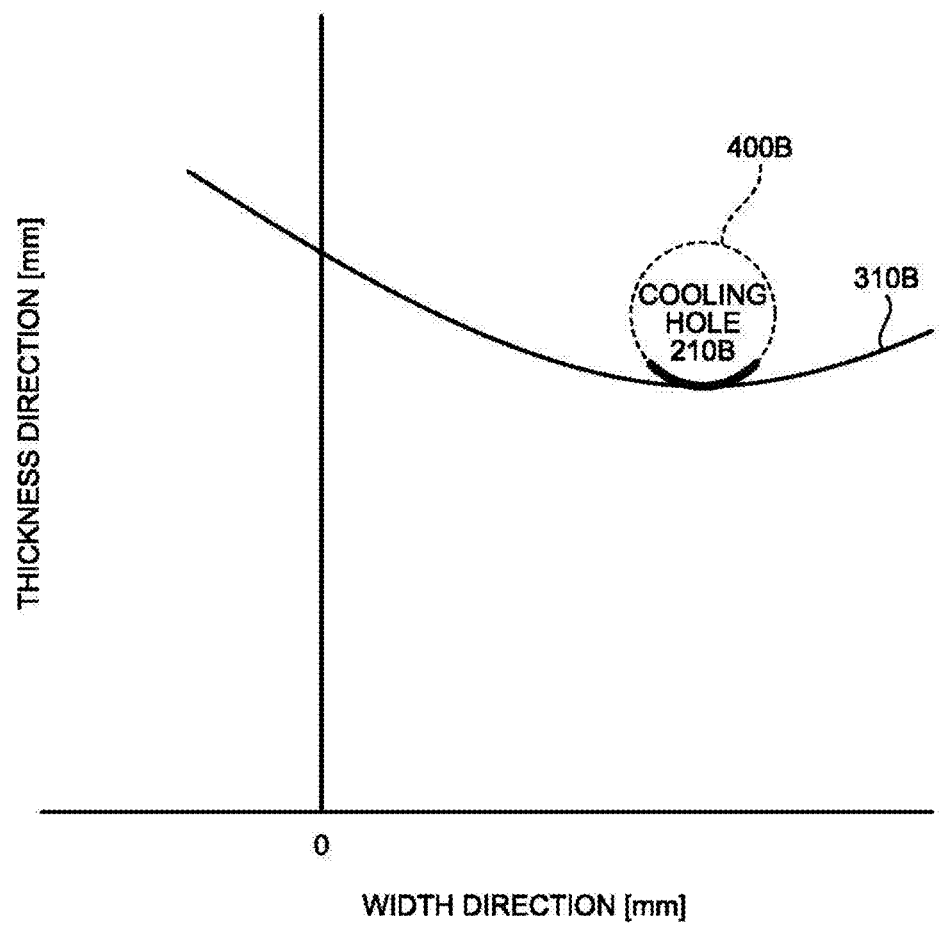
FIG. 13 is a diagram for describing the measurement method for the measurement system according to the embodiment of the present invention.

Referring to FIG. 11 and FIG. 13, the measurement method using the measurement system 10 is described in more detail. FIG. 13 is a diagram for describing the measurement method for the measurement system according to the embodiment of the present invention. A measurement arcuate waveform 310A illustrated in FIG. 11 can be identified as a corresponding ideal arcuate waveform 300, and it is difficult to identify a measurement arcuate waveform 310B as a corresponding ideal arcuate waveform 300. In other words, the shallowest position $C_{OA}(X_{COA}, Y_{COA})$ of the cooling hole 210A can be estimated, but the shallowest position $C_{OB}(X_{COB}, Y_{COB})$ of the cooling hole 210B cannot be estimated.

First, the shallowest position $C_{OA}(X_{COA}, Y_{COA})$ of the cooling hole 210A is acquired from the measurement arcuate waveform 310A illustrated in FIG. 11. The hole center position is estimated as the position of the cooling hole 210A. In this manner, the hole surface shape 400A of the cooling hole 210A is calculated.

A waveform in antiphase to the measurement arcuate waveform 310A used to estimate the position of the cooling hole 210A is added to the measurement arcuate waveform 310 to acquire a measurement arcuate waveform 310B illustrated in FIG. 13. The measurement arcuate waveform 310B illustrated in FIG. 13 is obtained by removing the measurement arcuate waveform 310A, which is a measurement signal component of the cooling hole 210A, from the arcuate waveform scope illustrated in FIG. 11, so that the measurement signal component of the cooling hole 210B is left. In FIG. 13, the measurement arcuate waveform 310B can be identified as a corresponding ideal arcuate waveform 300. The shallowest position $C_{OB}(X_{COB}, Y_{COB})$ of the cooling hole 210B are acquired from the measurement arcuate waveform 310B illustrated in FIG. 13. A hole center position is estimated as the position of the cooling hole 210B. In this manner, the hole surface shape 400B of the cooling hole 210B is calculated.

In this manner, the ideal arcuate waveform 300 and the measurement arcuate waveform 310 are collated with each other to estimate the position of the cooling hole 210. A waveform in antiphase to the measurement arcuate waveform 310 with which the position of the cooling hole 210 has been estimated is added to the measurement arcuate waveform 310, thereby obtaining a measurement arcuate waveform 310 from which the measurement arcuate waveform 310 used to estimate the position of the cooling hole 210 has been subtracted. The ideal arcuate waveform 300 and the measurement arcuate waveform 310 are collated with each other to estimate the position of the cooling hole 210. Repeating the processing described above enables the positions of all cooling holes 210 to be estimated even when the distance between cooling holes 210 is short and measurement arcuate waveforms 310 interfere with each other.

Subsequently, a machining method using the machining system 1 is described. The measurement system 10 outputs measurement results to the correction system 20. Based on the measurement results of the measurement system 10, the correction system 20 changes machining conditions of the cooling hole 210 and corrects the position of the cooling hole 210. The machining control system 30 controls the machining device 100 based on the machining conditions changed by the correction system 20.

In this manner, the position of the cooling hole 210 is measured as needed at the time of producing of the cooling hole 210 by the machining device 100. The machining condition of the cooling hole 210 is changed in accordance with the measurement result of the measurement system 10 to correct the position of the cooling hole 210 as needed. The machining device 100 is controlled as needed such that the position of the cooling hole 210 is corrected depending on the machining condition changed in accordance with the measurement result of the measurement system 10. Repeating the processing described above prevents an error from machining position information from occurring in the position of the produced cooling hole 210.

As described above, according to the present embodiment, the ideal arcuate waveform 300 and the measurement arcuate waveform 310 are collated with each other to estimate the position of a cooling hole 210 from a measurement arcuate waveform 310 determined to correspond to any ideal arcuate waveform 300. A waveform in antiphase to the measurement arcuate waveform 310 with which the position of the cooling hole 210 has been estimated is added to the measurement arcuate waveform 310, thereby obtaining a measurement arcuate waveform 310 from which the measurement arcuate waveform 310 used to estimate the position of the cooling hole 210 has been subtracted. The ideal arcuate waveform 300 and the measurement arcuate waveform 310 are collated with each other to estimate the position of the cooling hole 210. Repeating the processing described above enables the positions of all cooling holes 210 to be estimated even when the distance between cooling holes 210 is short and measurement arcuate waveforms 310 interfere with each other.

In this manner, according to the present embodiment, the positions of all cooling holes 210 can be estimated by a single ultrasonic testing sensor 110 without adding additional ultrasonic testing sensor 110 or increasing the scanning direction of the ultrasonic testing sensor 110.

In the present embodiment, the positions of all cooling holes 210 can be estimated even when the distance between cooling holes 210 is short and measurement arcuate waveforms 310 interfere with each other. Thus, the positions of all cooling holes 210 can be estimated with high accuracy even at the blade tip portion of the turbine blade 200 where the cooling holes 210 are arranged in proximity. In both cases where the cooling hole 210 extends straight from the blade tip to the blade root of the turbine blade 200 and the case where the cooling hole 210 extends in a curved line, the positions of all cooling holes 210 can be estimated with high accuracy.

In the present embodiment, the position of the cooling hole 210 being produced is estimated, and the machining conditions are changed based on the estimated position of the cooling hole 210, thereby correcting the position of the cooling hole 210. According to the present embodiment, the position of the cooling hole 210 can be corrected as needed to produce the cooling hole 210 with high accuracy.

In the present embodiment, cooling holes 210 can be produced with high accuracy even when the distance between cooling holes 210 is short and measurement arcuate waveforms 310 interfere with each other. Thus, cooling holes 210 can be produced with high accuracy even at the blade tip portion of the turbine blade 200 where the cooling holes 210 are arranged in proximity. In both cases where the cooling hole 210 extends straight from the blade tip to the blade root of the turbine blade 200 and the case where the cooling hole 210 extends in a curved line, the cooling hole 210 can be produced with high accuracy.

While the measurement system, the machining system, the measurement method, and the computer program according to the present embodiment have been described, the measurement system, the machining system, the measurement method, and the computer program may be implemented in various forms different from those in the above-mentioned embodiment may be implemented.

The measurement system 10, the correction system 20, and the machining control system 30 may be implemented as independent control devices, or may be implemented as a combined control device.

Figure 14:
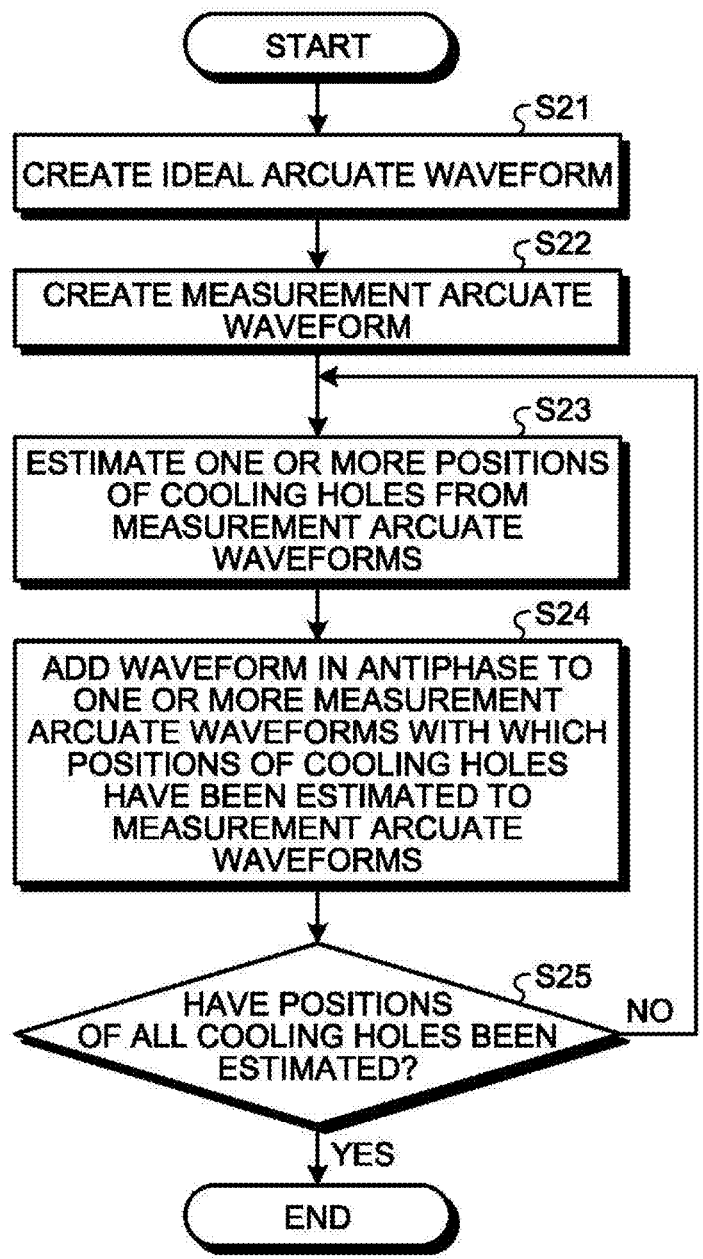
FIG. 14 is a flowchart illustrating another example of the measurement method for the measurement system according to the embodiment of the present invention.

Referring to FIG. 14, another example of the measurement method using the measurement system 10 is described. FIG. 14 is a flowchart illustrating another example of the measurement method for the measurement system according to the embodiment of the present invention. Step S21, Step S22, and Step S25 correspond to Step S11, Step S12, and Step S15.

The measurement system 10 estimates one or more positions of the cooling hole 210 from the measurement arcuate waveform 310 (Step S23). More specifically, the measurement system 10 uses the position estimation unit 13 to collate the ideal arcuate waveform 300 and the measurement arcuate waveform 310 with each other to estimate one or more positions of the cooling hole 210 from one or more measurement arcuate waveforms 310 determined to correspond to any ideal arcuate waveform 300. In other words, the measurement system 10 collates the ideal arcuate waveform 300 and the measurement arcuate waveform 310 with each other, and when there are measurement arcuate waveforms 310 determined to correspond to an ideal arcuate waveform 300, the position of the cooling hole 210 is estimated from each of the measurement arcuate waveforms 310. The measurement system 10 proceeds to Step S24.

The measurement system 10 adds, to the measurement arcuate waveforms 310, waveforms in antiphase to one or more measurement arcuate waveforms 310 with which the positions of cooling holes 210 have been estimated (Step S24). More specifically, the measurement system 10 uses the antiphase waveform addition unit 14 to add, to the measurement arcuate waveforms 310, waveforms in antiphase to one or more measurement arcuate waveforms 310 with which the positions of cooling holes 210 have been estimated by the position estimation unit 13. The measurement system 10 proceeds to Step S25.

By executing the processing as illustrated in FIG. 14, the number of times of repetition of processing of executing the processing of Step S23 again after No is determined at Step S25 can be suppressed.

The order of Step S11 and Step S12 in the flowchart illustrated in FIG. 12 may be reversed. The measurement system 10 may first use the measurement arcuate waveform creation unit 12 to create a measurement arcuate waveform 310, and thereafter use the ideal arcuate waveform creation unit 11 to create an ideal arcuate waveform 300.

The processing of Step S11 in the flowchart illustrated in FIG. 12 may be executed in advance when the cooling hole 210 is designed.

The subject described above is a cooling hole 210 formed in a turbine blade 200 of a gas turbine, but is not limited thereto. It is only necessary that position information at the time of designing be acquired from the subject. A plurality of subjects are not limited to the same ones, and may be different.

REFERENCE SIGNS LIST

1 Machining system
10 Measurement system
11 Ideal arcuate waveform creation unit
12 Measurement arcuate waveform creation unit
13 Position estimation unit
14 Antiphase waveform addition unit
20 Correction system
30 Machining control system
100 Machining device
110 Ultrasonic testing sensor
200 Turbine blade
210 Cooling hole (subject)
300 Ideal arcuate waveform
310 Measurement arcuate waveform
400 Hole surface shape

The invention claimed is:

1. A measurement system for measuring positions of a plurality of subjects by using an ultrasonic testing sensor, the measurement system comprising:

an ideal arcuate waveform creation unit configured to create, for each of the subjects, an ideal arcuate waveform of a measurement result of the ultrasonic testing sensor based on machining position information on the subject;

a measurement arcuate waveform creation unit configured to create a measurement arcuate waveform based on the measurement result;

a position estimation unit configured to collate the ideal arcuate waveform and the measurement arcuate waveform with each other to estimate a position of the subject from the measurement arcuate waveform determined to correspond to any ideal arcuate waveform; and an antiphase waveform addition unit configured to add, to the measurement arcuate waveform, a waveform in antiphase to the measurement arcuate waveform with which the position of the subject has been estimated.

2. The measurement system according to claim 1, wherein the subject is a cooling hole produced in a turbine blade of a gas turbine.

3. The measurement system according to claim 1, further comprising the ultrasonic testing sensor configured to measure the positions of the plurality of subjects and output the measurement results to the measurement system.

4. A machining system, comprising:
the measurement system according to claim 1;
a machining device configured to produce the plurality of subjects by machining;
the ultrasonic testing sensor configured to measure the position of the subject produced by the machining device;
a correction system configured to, based on a measurement result of the measurement system, change machining conditions of the subject and correct the position of the subject; and
a machining control system configured to control the machining device based on the machining conditions changed by the correction system.

5. A machining system, comprising:
the measurement system according to claim 1;
a machining device configured to machine a workpiece to simultaneously produce the plurality of holes each having a depth more than a diameter of the hole;
the ultrasonic testing sensor configured to measure a position of the hole while the hole is produced to extend in the depth direction by the machining device, the position of the hole indicating a position of a bottom of the hole;
a correction system configured to correct a machining position of the hole to be continuously produced; and
a machining control system configured to control the machining device based on a machining condition for producing the hole,
wherein the correction system is configured to change the machining condition based on the corrected machining position, and
the machining control system is configured to control the machining device to continuously produce the hole according to the changed machining condition.

6. A measurement method for measuring positions of a plurality of subjects by using an ultrasonic testing sensor, the measurement method comprising:
creating, for each of the subjects, an ideal arcuate waveform as a measurement result of the ultrasonic testing sensor based on machining position information on the subject;
creating a measurement arcuate waveform based on the measurement result;
collating the ideal arcuate waveform and the measurement arcuate waveform with each other to estimate the position of the subject from the measurement arcuate waveform determined to correspond to any ideal arcuate waveform; and
adding, to the measurement arcuate waveform, a waveform in antiphase to the measurement arcuate waveform with which the position of the subject has been estimated.

7. A non-transitory computer-readable recording medium on which an executable program for measuring positions of a plurality of subjects by using an ultrasonic testing sensor is stored, the computer program causing a computer to execute:
creating, for each of the subjects, an ideal arcuate waveform as a measurement result of the ultrasonic testing sensor based on machining position information on the subject;
creating a measurement arcuate waveform based on the measurement result;
collating the ideal arcuate waveform and the measurement arcuate waveform with each other to estimate the position of the subject from the measurement arcuate waveform determined to correspond to any ideal arcuate waveform; and
adding, to the measurement arcuate waveform, a waveform in antiphase to the measurement arcuate waveform with which the position of the subject has been estimated.

* * * * *